United States Patent
Niner et al.

(10) Patent No.: US 9,455,435 B2
(45) Date of Patent: Sep. 27, 2016

(54) JUMP START CONTACT PROTECTION INTERFACE

(71) Applicant: GM GLOBAL TECHNOLOGY OPERATIONS LLC, Detroit, MI (US)

(72) Inventors: Rod Niner, Royal Oak, MI (US); Robert J. Schwabel, Shelby Township, MI (US); Brian J. Ciesinski, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 14/097,562

(22) Filed: Dec. 5, 2013

(65) Prior Publication Data

US 2015/0162591 A1    Jun. 11, 2015

(51) Int. Cl.
| | |
|---|---|
| *H01M 2/34* | (2006.01) |
| *H01M 2/30* | (2006.01) |
| *H01M 10/42* | (2006.01) |
| *H01R 11/22* | (2006.01) |

(52) U.S. Cl.
CPC .............. *H01M 2/34* (2013.01); *H01M 2/305* (2013.01); *H01M 10/425* (2013.01); *H01M 2200/00* (2013.01); *H01M 2220/20* (2013.01); *H01R 11/22* (2013.01)

(58) Field of Classification Search
None
See application file for complete search history.

(56) References Cited

U.S. PATENT DOCUMENTS

| 6,245,457 B1 * | 6/2001 | Romero ............. H01M 2/1223 429/121 |
| 2010/0001582 A1 * | 1/2010 | Newhouse et al. .......... 307/10.1 |
| 2012/0013175 A1 * | 1/2012 | Newman et al. ............. 307/9.1 |

FOREIGN PATENT DOCUMENTS

| CN | 103097179 A | 5/2013 |
| JP | 2003204629 A | 7/2003 |
| JP | 2003244856 A | 8/2003 |
| JP | 2012105377 A | 5/2012 |

OTHER PUBLICATIONS

Chinese Patent and Trade Mark Office, Office Action for Chinese Patent Application No. 201410730915.8, mailed Jul. 5, 2016.

* cited by examiner

*Primary Examiner* — Patrick Ryan
*Assistant Examiner* — Christopher Domone
(74) *Attorney, Agent, or Firm* — Lorenz & Kopf, LLP (57) ABSTRACT

Apparatus are provided for receiving power from an external source. The apparatus includes a first electrical contact exposed to an exterior power source, a second electrical contact hardwired to an electrical bus, a separation device in physical contact with both the first electrical contact and the second electrical contact and conditionally insulating the first contact from the second contact and an electrical circuit configured to detect a voltage of the exterior power source and to physically modify the separation device to electrically connect the second contact to the exterior power source when a condition is met.

20 Claims, 8 Drawing Sheets

JUMP START CONTACT PROTECTION INTERFACE

TECHNICAL FIELD

The technical field generally relates to vehicle electrical systems, and more particularly relates to an interface that protects an electrical system against an overvoltage during a jump start of the vehicle or during a reverse battery condition.

BACKGROUND

The amount of the electrical load on a vehicle is growing and is ever more complex. When all systems are in operation concurrently, a vehicle may consume upwards of 77 amps, which is sizable amperage. Not only is the amount of the electrical load growing but the sophistication of the load is also growing with more and more processors and other electronic features and equipment being added. Existing techniques for protecting electronic features from over voltages and reverse voltages, such as diodes and input resistors, may entail costs including excess power consumption and/or fuel usage.

Accordingly, it is desirable to protect vehicle electronics while reducing power consumption. In addition, it is desirable to eliminate the need for over and reverse voltage protection devices on each module and reduce power consumed in normal vehicle operation. Furthermore, other desirable features and characteristics of the present invention will become apparent from the subsequent detailed description and the appended claims, taken in conjunction with the accompanying drawings and the foregoing technical field and background.

SUMMARY

A battery terminal is provided for receiving power from an external source. In one embodiment, the apparatus includes a first electrical contact exposed to an exterior power source, a second electrical contact hardwired to an electrical bus, a separation device in physical contact with both the first electrical contact and the second electrical contact and conditionally insulating the first contact from the second contact and an electrical circuit configured to detect a voltage of the exterior power source and to physically modify the separation device to electrically connect the second contact to the exterior power source when a condition is met. A relay or equivalent solid state device could also be used to electrically connect the second contact to the exterior power source.

A system is provided for receiving power from an external source. In one embodiment, the system includes an electrical bus of a vehicle, a vehicle battery, and a battery terminal. The battery terminal comprises a first electrical contact exposed to an exterior power source, a second electrical contact hardwired to the electrical bus of the vehicle, a separation device in contact with both the first electrical contact and the second electrical contact and conditionally insulating the first contact from the second contact, and an electrical circuit configured to detect a voltage of the exterior power source and to physically or electronically modify the separation device to electrically connect the first contact with the second contact when a condition is met.

A vehicle is provided for that receives power from an external source. In one embodiment the vehicle includes a vehicle body, a battery within the vehicle body; and a battery terminal. The battery terminal comprises a first electrical contact exposed to an exterior power source, a second electrical contact hardwired to an electrical bus, a separation device in contact with both the first electrical contact and the second electrical contact and conditionally insulating the first contact from the second contact, and an electrical circuit configured to detect a voltage of the exterior power source and to physically or electrically modify the separation device to electrically connect the first contact with the second contact when a condition is met.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Those of skill in the art will appreciate that the various illustrative logical blocks, modules, circuits, and algorithm steps described in connection with the embodiments disclosed herein may be implemented as electronic hardware, computer software executing on a processor, or combinations of both. Some of the embodiments and implementations are described above in terms of functional and/or logical block components (or modules) and various processing steps. However, it should be appreciated that such block components (or modules) may be realized by any number of hardware, software executing on a processor, and/or firmware components configured to perform the specified functions.

To clearly illustrate this interchangeability, various illustrative components, blocks, modules, circuits, and steps may be described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 2:
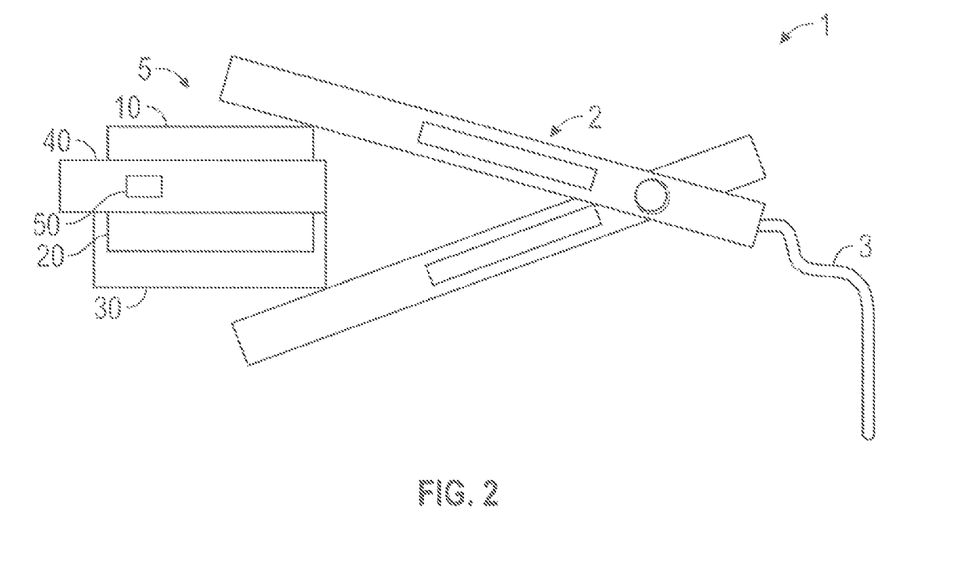
FIG. 2 is a simplified diagram of a protection interface in accordance with an embodiment.

FIG. 2 is a simplified diagram of an embodiment of a protection interface 5 disclosed herein that is used in conjunction with an electrical contact 2 of a jumper cable 3. As a non-limiting example, the cable may be a traditional jumper cable 3 that include metal (e.g., copper) alligator clips 2 on each end of the cable 3. However, other cable and contact designs that currently exist or that may be devised in the future can be readily adapted to be used herein without departing from the scope and spirit of this disclosure (See, e.g., FIG. 6A).

Figure 1:
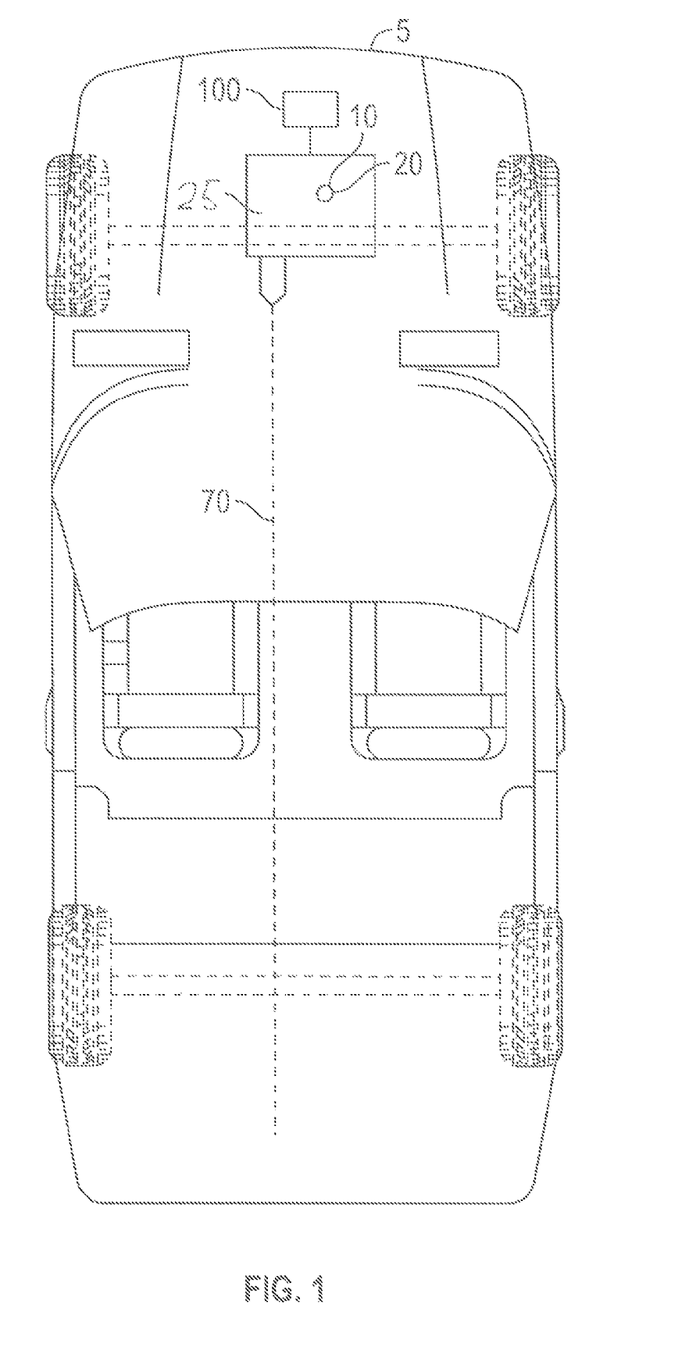
FIG. 1 is a simplified vehicle in accordance with an embodiment.

In essence a faux electrical contact, also known herein as an "extra contact" 10, is used to cover or electrically protect the actual contact that is directly connected (i.e., hardwired) to the vehicle electrical system 70 (See, FIG. 1). The actual contact to the electrical system of the vehicle 5 is referred to herein and the "protected contact" 20. If necessary, the protected contact 20 is further protected from contact with the alligator clip 2 by an insulating layer of material 30. However, this insulating layer 30 may be optional depending on the construction and orientation of the protected contact 20.

In the embodiment of a protection interface 5 illustrated in FIG. 2, the extra contact 10 and the protected contact 20 are separated by an electronically controlled separating device 40. The separating device 40 is a self-contained mechanical or electronic switch such that when the voltage at the alligator clip 2 is sensed by the separating device 40 at extra contact 10 to be of the proper voltage level and polarity, the external power from the alligator clip 2 is electrically connected to the protected contact 20 by separating device 40 via the extra contact 10. If the voltage is improper, the connection is not completed. The separating device 40 may have any suitable form factor and use method of operation as long as the form factor is physically constructed of a non-conducting structural material that is capable of electrically insulating the extra contact 10 from the protected contact 20.

In other embodiments the separating device may be a semi-conducting silicon device. The silicon device insulates/separates the extra contact from the actual contact when not biased "on" and would conduct when properly biased. In some embodiments, the semi-conducting silicon device may be manifested as a 1000 amp switch.

Figure 3A:
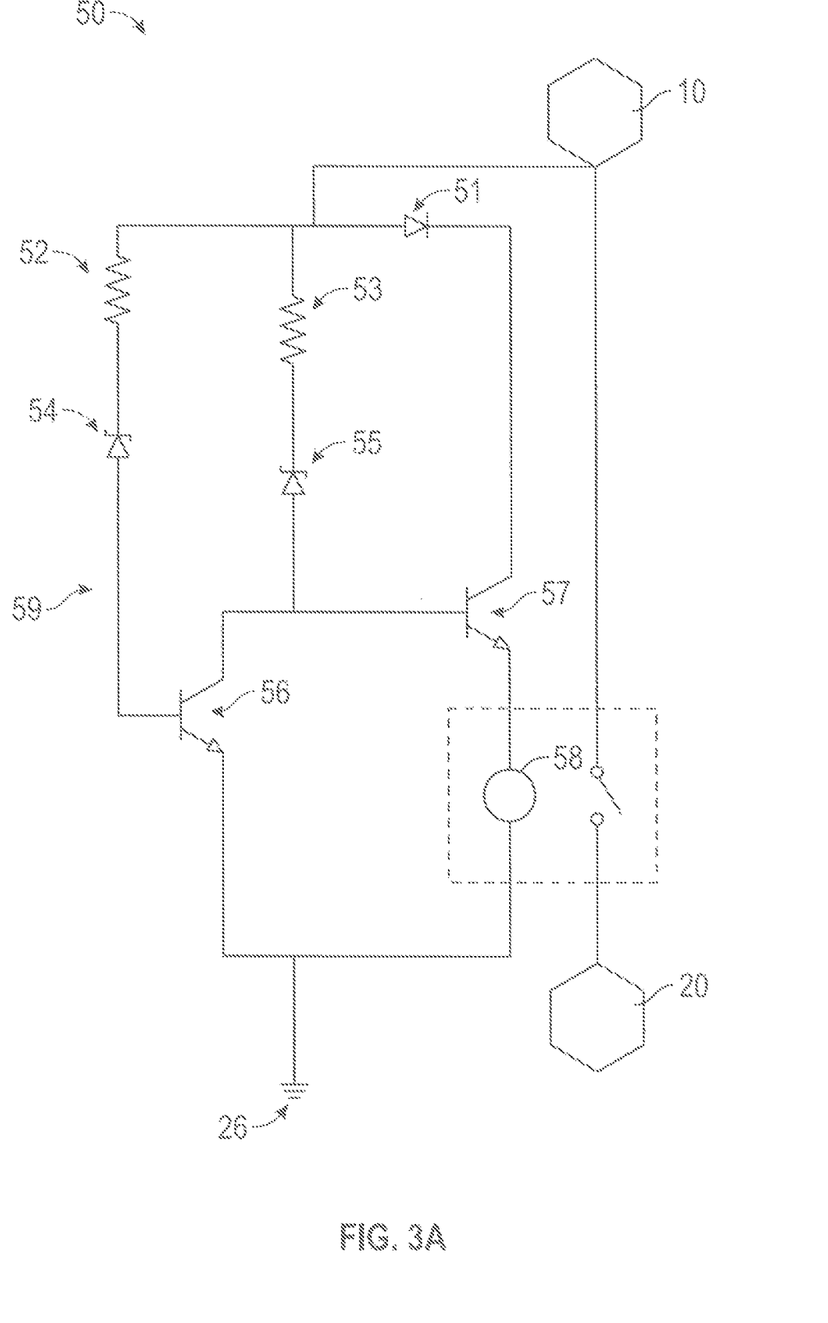
FIG. 3A is a schematic of an electronic control circuit for a separation device in accordance with an embodiment.

FIG. 3A presents an exemplary, non-limiting electronic switch 50 that may be used in the separating device 40 and is powered by the incoming voltage from the alligator clip 2 and/or from the protected contact 20. The switch 50 comprises a relay or a solid state switch 58 that may be any suitable relay that may be known in the art or that may be developed in the future. The relay/switch 58 electrically connects the extra contact 10 to the protected contact 20.

The switch/control circuit 50 comprises a diode 51, a high limit Zener diode 54, a low limit Zener diode 55 along with input resistors 52 and 53, respectively. The control circuit also comprises a first transistor 56 and a second transistor 57.

In operation, when the polarity of the voltage applied by the alligator clip 2 to the extra contact 10 is negative, or the voltage is below a predefined lower value the diode 51, the base emitter junctions of transistors 56 and 57 are reversed biased such that there is no current through relay 58. Hence, the separating device 40 does not allow a connection because transistor 57 is not biased to conduct.

When the voltage supplied from the alligator clip 2 is above the lower predefined value but below a upper predefined value, the low limit Zener diode breaks down into its conductive state allowing a base current to transistor to trigger the second transistor 57 thereby allowing current to flow through the relay 58 and shut the switch connecting the extra contact 10 to the protected contact 20.

When the voltage supplied by the alligator clip 2 is higher than the predetermined upper limit, the high limit Zener diode breaks down causing a base current to be applied to the first transistor 56 thereby shorting the base of second transistor 57 to ground 26 and interrupting the current flow through the switch/relay 58. Thus, protected contact 20 remains electrically isolated from the voltage at the alligator clip 2.

Figure 3B:
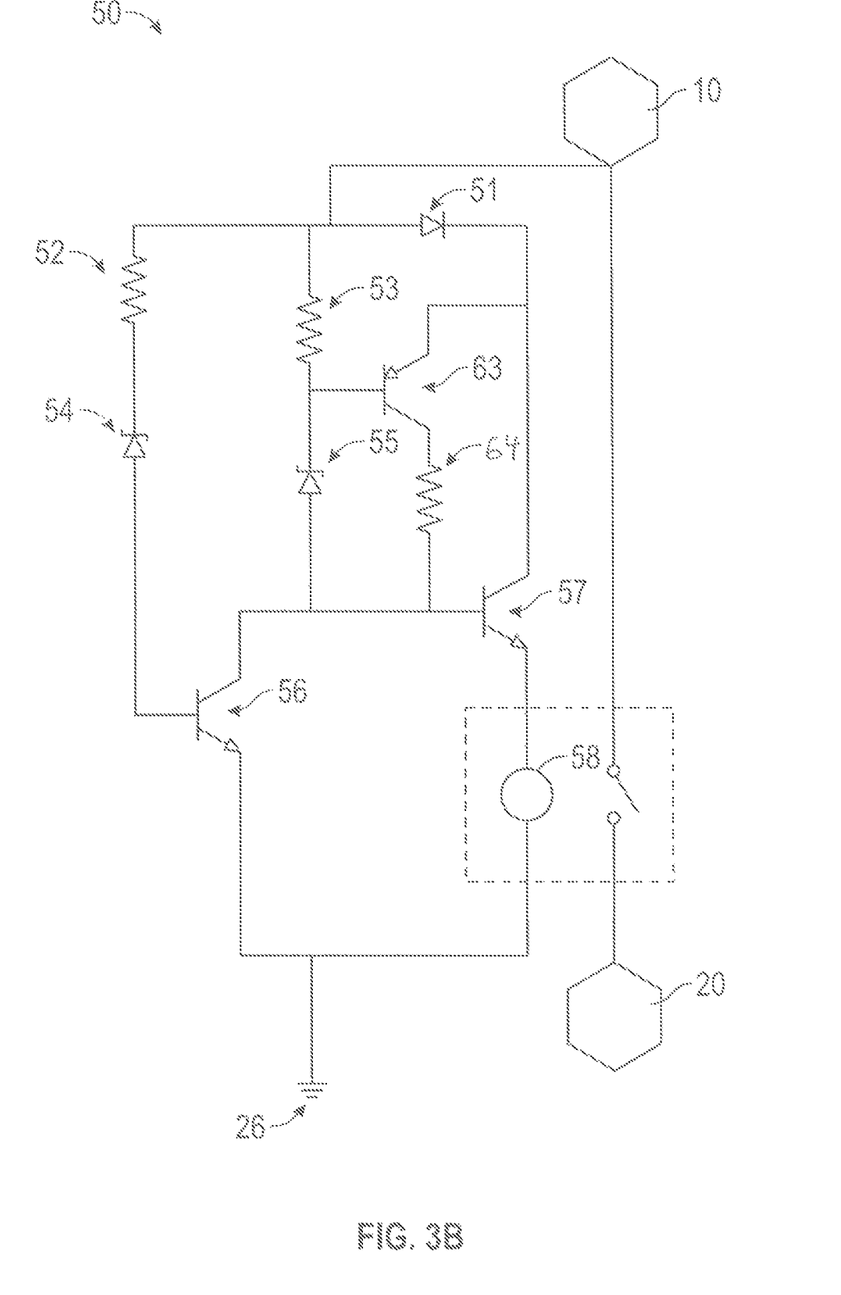
FIG. 3B is a schematic of a second electronic control circuit for a separation device in accordance with an embodiment.

FIG. 3B is another exemplary embodiment of switch/control circuit 50 but includes transistor 63 and resistor 64. The purpose of transistor 63 is to create a greater change in "On" current so that there will be a sharper turn on voltage point.

Figure 3C:
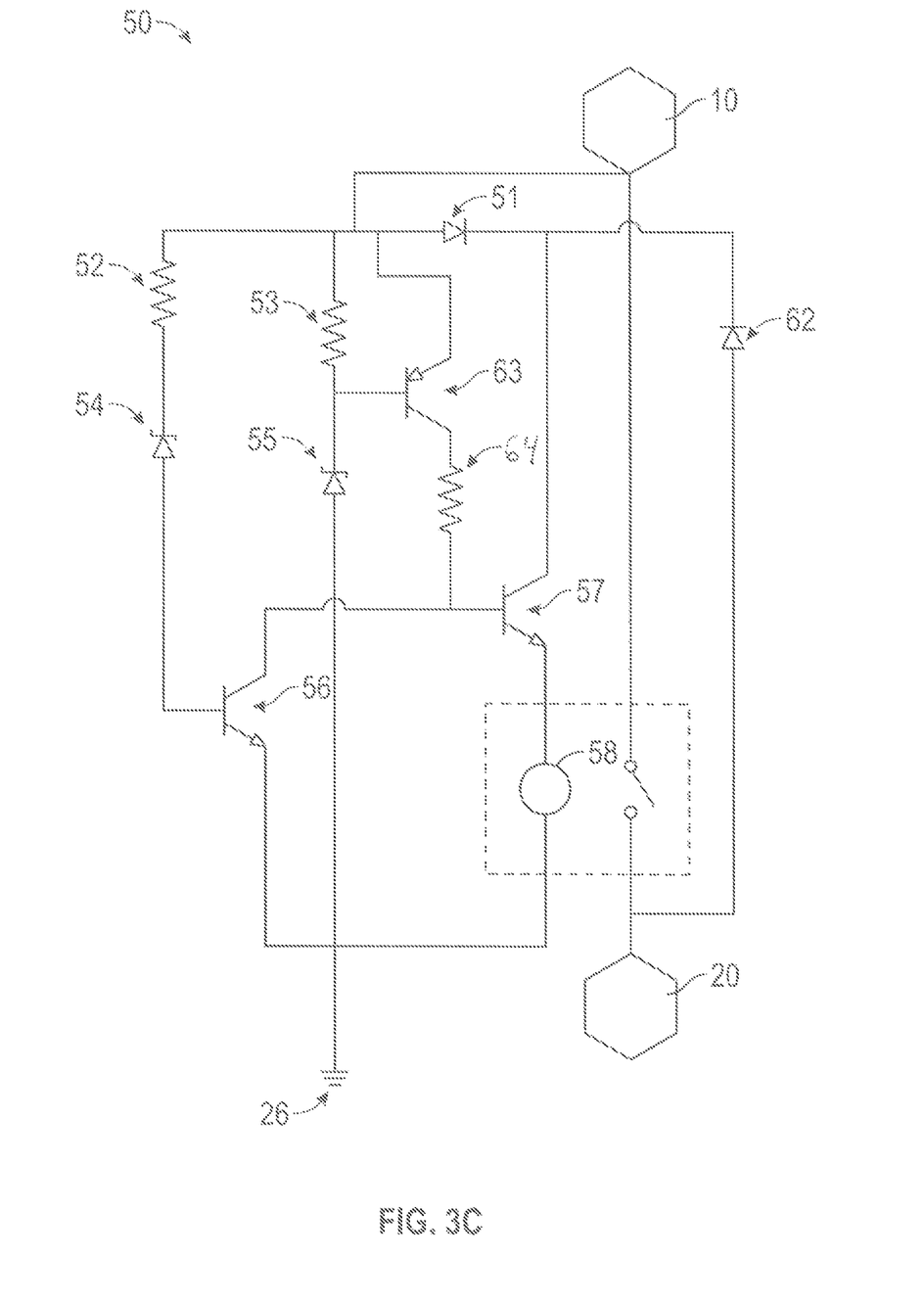
FIG. 3C is a schematic of a third electronic control circuit for a separation device in accordance with an embodiment.

FIG. 3C is yet another exemplary embodiment of switch/control circuit 50 but includes diode 62. The purpose of diode 62 is to ensure there is enough power from the alligator clip 2 to engage the relay 58.

Figure 4:
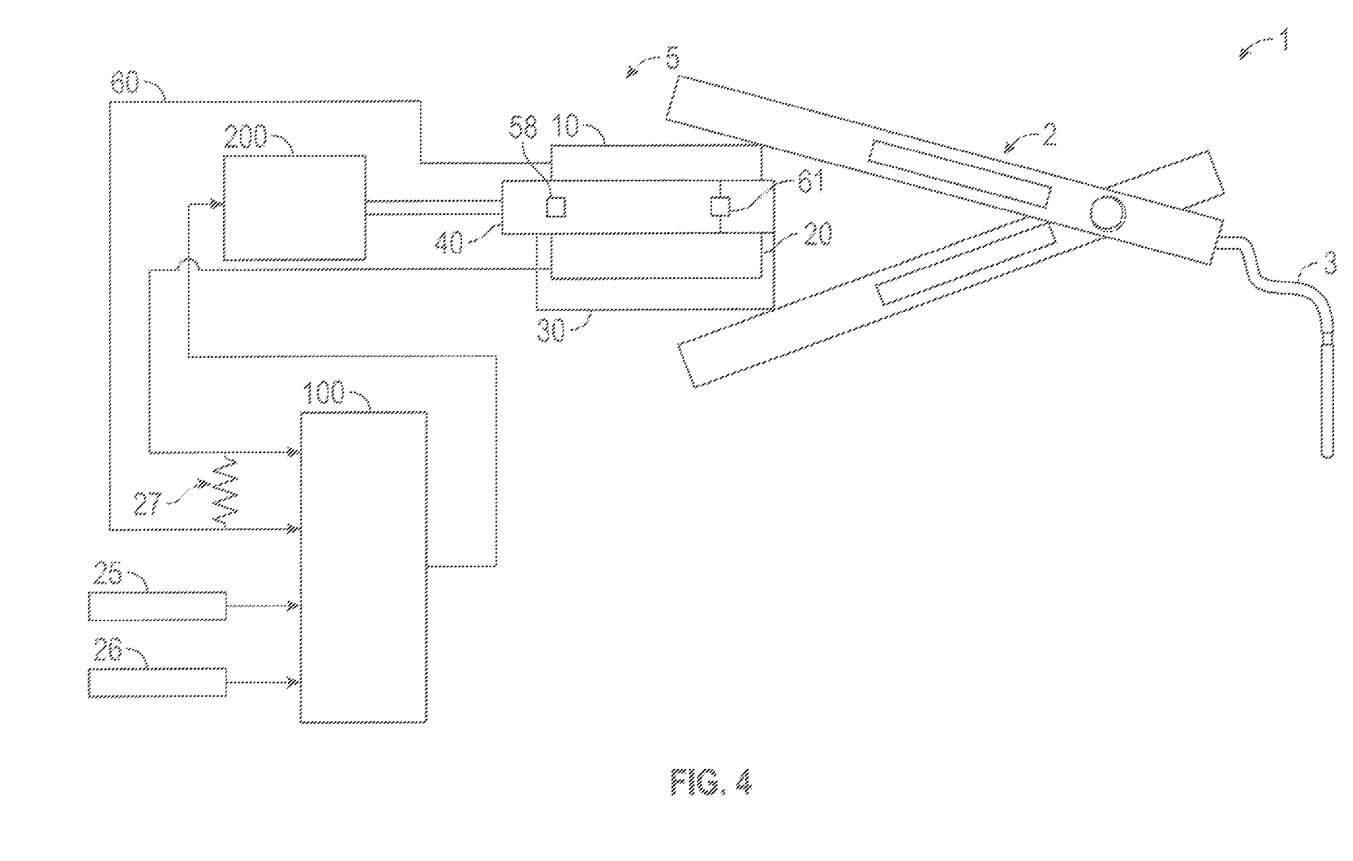
FIG. 4 is a simplified schematic of an exemplary mechanical separation device and an exemplary control system in accordance with an embodiment.

FIG. 4 is a simplified system diagram of a non-limiting alternative embodiment of the protective interface 5 wherein the separation device 40 includes a mechanical device switch. As in the case of the embodiment of FIG. 2, the physical arrangement of the extra contact 10, the separating device 40 and the insulator 30, is configured such that is not possible for the alligator clip 2 to touch the protected contact 20, but only the extra contact 10.

When the extra contact 10 is touched by alligator clip 2, the potential of the alligator clip 2 is sensed by Electronic Control Unit (ECU) 100, via lead wire 60. The ECU 100 is a non-limiting, exemplary control device and may comprise any suitable digital or analog circuitry known in the art or that may be developed in the future.

The ECU 100 is configured such that when the polarity and the amount of voltage is correct and within limits, the ECU 100 causes the actuator 200 to modify the separation device 40 to connect the extra contact 10 with the protected contact 20 to provide power to the vehicle. The term "modify" herein means a change in physical state from a conducting state to a non-conducting state or from a non-conducting state to a conducting state.

The electronic control unit 100 may receive its power from the alligator clip 2 via the extra contact 10 when the alligator clip contacts the extra contact 10. Or, the electronic control unit 100 may receive its power from the vehicle battery 25. The ECU 100 has a ground 26.

In an equivalent embodiments of the protective interface 5, the interface may include a sensing resistor 27 arranged to sense the potential difference between the extra contact and the protected contact. The inclusion of a sensing resistor 27 is an optional feature.

An advantage of the sensing resistor 27 is that it allows the safe parallel connection of the batteries 25 of two vehicles equipped with the protection interface 5. For example, a driver may activate a circuit or a resistive switch 61 (e.g., a circuit breaker) in the protective interface 5 of the vehicle with a good battery 25. The resistive switch circuit 61 connects power from the protected contact 20 to the extra contact 10 to provide power to the extra contact and thus to the dead battery. The sensing resistor 27 monitors against an excessive current condition and will open resistive switch circuit 61 in such a case. With this power connection, the protective interface 5 of the bad battery would connect its extra contact 10 to its protected contact 20 in the normal manner as described above. The protective interface 5 of the good battery would then connect its extra contact 10 to its protected contact 20 in the normal manner as described above.

Figure 5:
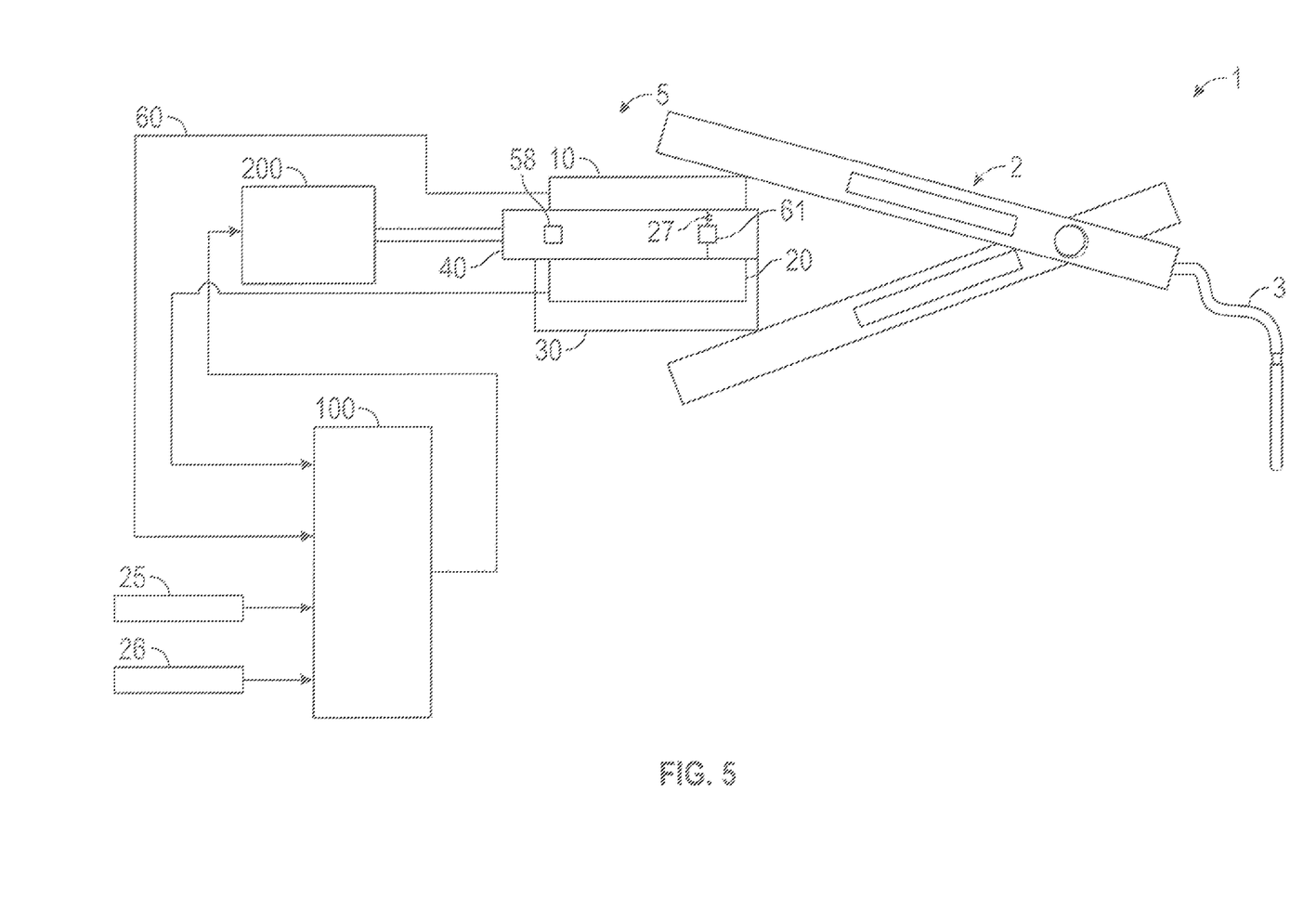
FIG. 5 is a another simplified schematic of an exemplary mechanical separation device and an exemplary control system in accordance with an embodiment

FIG. 5 is another equivalent embodiment of the protective interface 5. Wherein like numbers reflect like components of FIG. 4. In the alternative embodiment of FIG. 5, resistor 27 is in series with switch 61.

In the vehicle 400 (See FIG. 1) with a good battery 25 (See FIG. 1) the switch 61 is closed (manually or automatically) and applies voltage to the extra contact via resistor 27. This same vehicle monitors the voltage drop across this resistor 27 via the ECU 100 and opens switch 61 if the resulting current is excessive as would recognized by those of ordinary sill in the art. The closing of switch 61 applies voltage thru the resistor 27 so that second vehicle with the bad battery can assess the voltage of the good battery 25 and will close its electronically controlled separating device 40 in the manner discussed above. The detection circuit on the vehicle 400 with the good battery has been disabled during this sequence until the voltage across resistor 27 has been verified and sufficient time has elapsed to ensure the vehicle with the bad battery has had enough time to close its electronically controlled separating device 40. Non-limiting examples of switch 61 could be a resettable switch or a nonlinear resistor that could increase its resistance in response to excessive current.

Figure 6A:
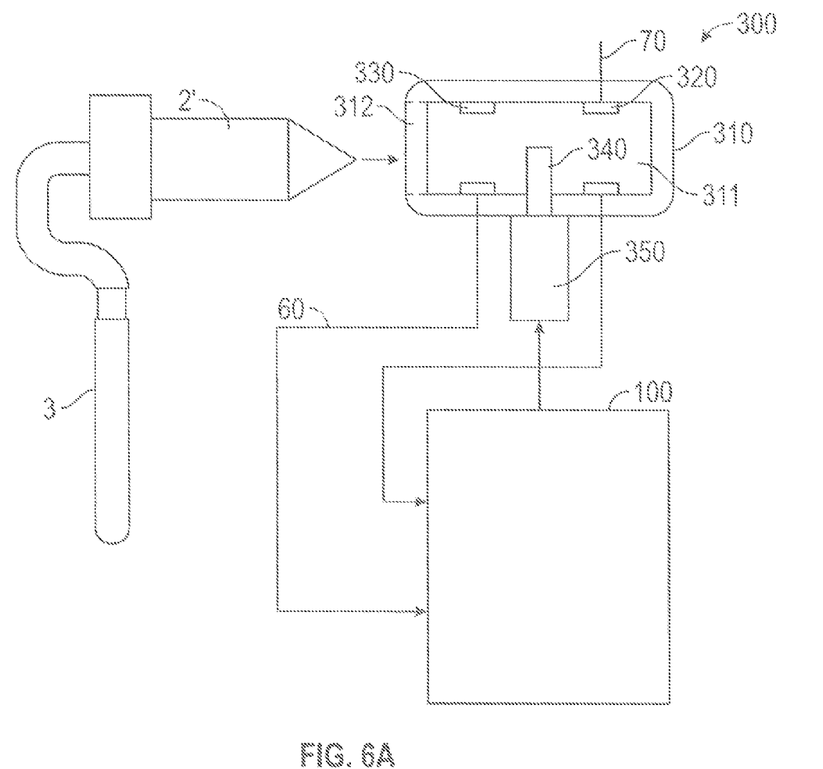
FIGS. 6A and 6B are a side view and a plan view of another exemplary mechanical separation device in accordance with an embodiment.
Figure 6B:
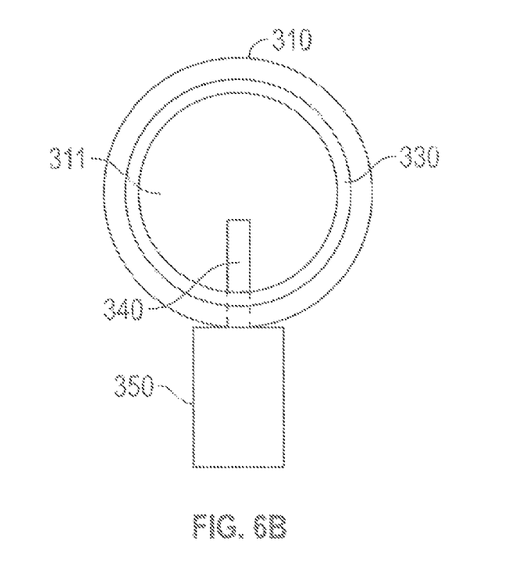

FIGS. 6A and 6B are simplified side and plan view, respectively, of an exemplary, non-limiting mechanical separation device 300. These particular drawings assume that the jumper cable 3 has a pin or a rod 2' in place of the traditional alligator clip 2. However, the geometry of the separation device 300 can be a substantially parallelepiped shape instead of a cylinder such that the alligator clip 2 can be inserted while in a shut position in the same fashion as the depicted rod 2'.

The mechanical separation device 300 includes a hollow casing 310 with at least one open end 312, a protected contact 320, an extra contact 330, an ECU 100, a plunger 340 (or other physical barrier element) penetrating the wall of the hollow casing and protruding into the interior space 311 of the hollow casing, and a solenoid 350. The ECU 100 controls solenoid 350 and thereby the position of the plunger 340 placing it into either a powered retracted state or in a normally unpowered extended state.

In the normally unpowered state, where no jumper cable rod is present, the plunger 340 is in its normally extended position. In this position, rod 2' cannot pass into the hollow casing far enough to contact the protected contact 320 due the interference of the extended plunger 340. However, rod 2' can penetrate far enough to contact the extra contact 330. Once the rod 2' contacts the extra contact 330, the voltage polarity and amount is sensed at the extra contact by ECU 100 via lead 60. When the voltage delivered by the rod is a positive polarity and is between a predetermined maximum and a predetermined minimum, the ECU 100 energizes the solenoid 350 which withdraws plunger 340 from the interior space 311 to allow the rod 2' to penetrate further and contact the protected contact, thereby delivering power to the vehicle via power take off 70.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A battery terminal comprising:
a first electrical contact exposed to an exterior power source;
a second electrical contact hardwired to an electrical bus;
a mechanical separation device in physical contact with both the first electrical contact and the second electrical contact and conditionally insulating the first electrical contact from the second electrical contact; and
an electrical circuit configured to detect a voltage of the exterior power source and to physically modify the mechanical separation device to electrically connect the second electrical contact to the first electrical contact, to thereby connect the second electrical contact to the exterior power source, when a condition is met;
wherein the first electrical contact is not hardwired to the electrical bus, and the first electrical contact is configured to selectively cover the second electrical contact to prevent electrical connection between the second electrical contact and the exterior power source when the condition is not met.

2. The battery terminal of claim 1, wherein the first electrical contact is a plate.

3. The battery terminal of claim 1, wherein the mechanical separation device connects the first electrical contact to the second electrical contact using an electronic switch.

4. The battery terminal of claim 1, wherein the mechanical separation device includes a physical barrier between the second electrical contact and the exterior power source.

5. The battery terminal of claim 4 further comprising an electronic control unit controlling a position of the physical barrier based on the voltage of the exterior power source.

6. The battery terminal of claim 5, wherein the mechanical separation device allows electrical and physical connection of the exterior power source to the second electrical contact by retracting the physical barrier.

7. A system for transmitting power from an exterior power source, comprising:
an electrical bus of a vehicle;
a vehicle battery; and
a battery terminal, where in the battery terminal comprises:
a first electrical contact exposed to an exterior power source,
a second electrical contact hardwired to the electrical bus of the vehicle, and
a mechanical separation device in contact with both the first electrical contact and the second electrical contact and conditionally insulating the first electrical contact from the second electrical contact, and
an electrical circuit configured to detect a voltage of the exterior power source and to physically modify the mechanical separation device to electrically connect the first electrical contact with the second electrical contact, to thereby connect the second electrical contact with the exterior power source, when a condition is met;
wherein the first electrical contact is not hardwired to the electrical bus, and the first electrical contact is configured to selectively cover the second electrical contact to prevent electrical connection between the second electrical contact and the exterior power source when the condition is not met.

8. The battery terminal of claim 7, wherein the first electrical contact is a post.

9. The battery terminal of claim 7, wherein the mechanical separation device connects the first electrical contact to the second electrical contact using an electronic switch.

10. The battery terminal of claim 7, wherein the mechanical separation device includes a physical barrier between the second electrical contact and the exterior power source.

11. The battery terminal of claim 10 further comprising an electronic control unit controlling a position of the physical barrier based on the voltage of the exterior power source.

12. The battery terminal of claim 11, wherein the mechanical separation device allows electrical and physical connection of the exterior power source to the second electrical contact by retracting the physical barrier.

13. A vehicle, comprising:
a vehicle body;
a battery within the vehicle body; and
a battery terminal, the battery terminal comprising:
a first electrical contact exposed to an exterior power source,
a second electrical contact hardwired to an electrical bus,
a mechanical separation device in contact with both the first electrical contact and the second electrical contact and conditionally insulating the first electrical contact from the second contact, and
an electrical circuit configured to detect a voltage of the exterior power source and to physically modify the mechanical separation device to electrically connect the first electrical contact with the second contact, to thereby electrically connect the second electrical contact with the exterior power source, when a condition is met;
wherein the first electrical contact is not hardwired to the electrical bus, and the first electrical contact is configured to selectively cover the second electrical contact to prevent electrical connection between the second electrical contact and the exterior power source when the condition is not met.

14. The battery terminal of claim 12, wherein the first electrical contact is one of a plate or a post.

15. The battery terminal of claim 12, wherein the mechanical separation device connects the first electrical contact to the second electrical contact using an electronic switch.

16. The battery terminal of claim 12, wherein the mechanical separation device includes a physical barrier between the second contact and the exterior power source.

17. The battery terminal of claim 15 further comprising an electronic control unit controlling a position of the physical barrier based on the voltage of the exterior power source.

18. The battery terminal of claim 10, wherein the mechanical separation device allows electrical and physical connection of the exterior power source to the second electrical contact by retracting the physical barrier.

19. The battery terminal of claim 10 wherein the mechanical separation device comprises a relay.

20. The battery terminal of claim 10 wherein the mechanical separation device is a solid state semiconductor device.

* * * * *